April 28, 1925.
L. C. VANDERLIP
MOTOR VEHICLE LOCK
Filed April 28, 1923
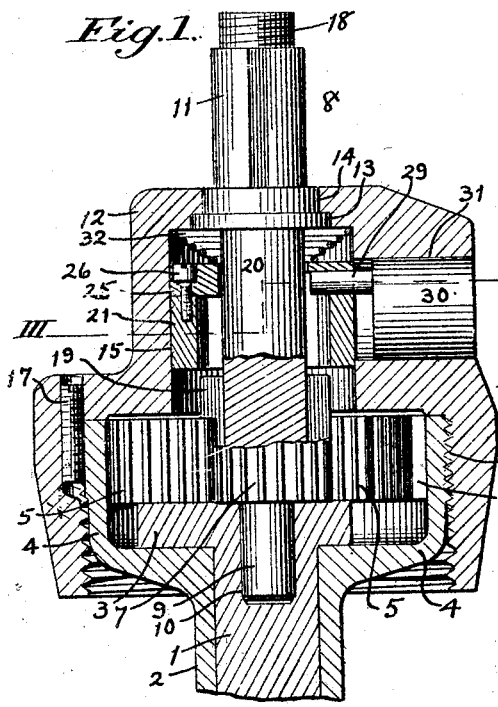
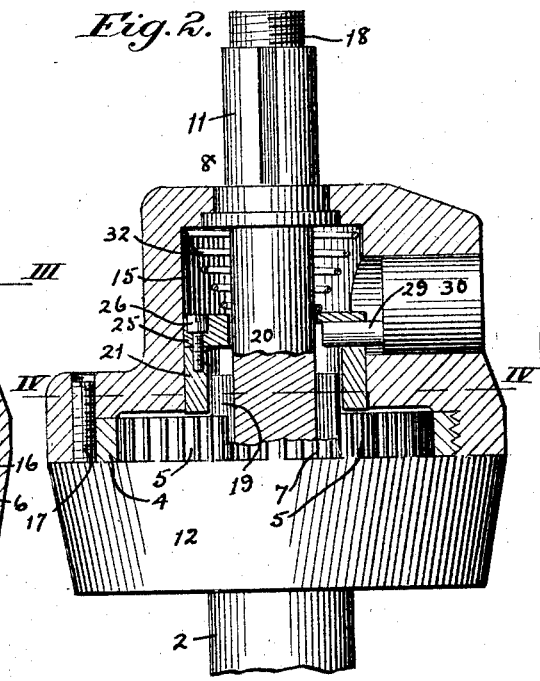
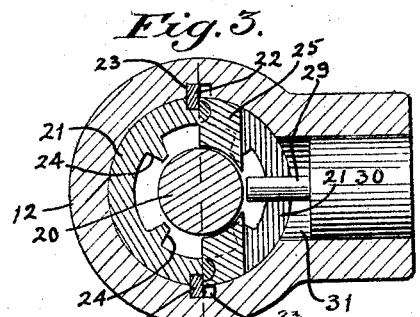
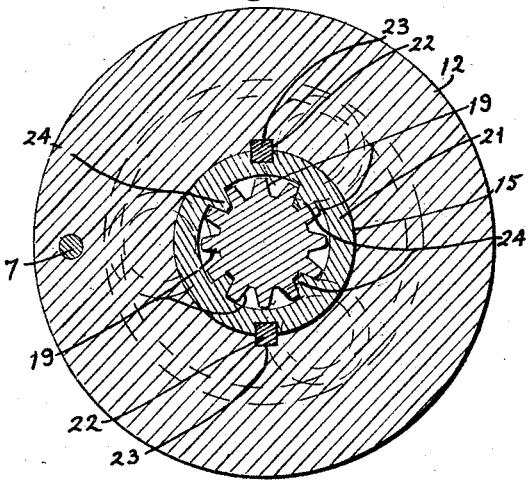
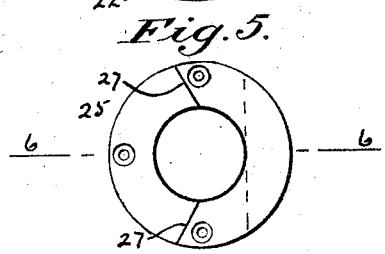
Inventor:
Louis C. Vanderlip.

Patented Apr. 28, 1925.

1,535,271

UNITED STATES PATENT OFFICE.

LOUIS C. VANDERLIP, OF ELKHART, INDIANA.

MOTOR-VEHICLE LOCK.

Application filed April 28, 1923. Serial No. 635,224.

*To all whom it may concern:*

Be it known that I, LOUIS C. VANDERLIP, a citizen of the United States, and a resident of the city of Elkhart, county of Elkhart, Indiana, have invented certain new and useful Improvements in Motor-Vehicle Locks, of which the following is a specification.

This invention relates to motor car steering mechanism, and particularly to locking means therefor.

An object of this invention is to provide a steering post lock for a motor car of the Ford type in which planetary gearing is used. Another object of the invention is to provide a steering wheel lock for the Ford motor car type in which the steering wheel and steering post are rendered non-rotatable when locked against unauthorized use. A third object of the invention is to provide means for locking the steering wheel shaft rigidly, to prevent unauthorized use of the car, which includes means engaging the extended teeth of the driver pinion of the planetary gears of the Ford steering head. Other objects of the invention are mentioned and described herein.

The preferred embodiment of my invention is illustrated in the accompanying drawing, in which Figure 1 is a section in elevation through a Ford motor car steering head with the invention applied thereto and showing the parts in the driving position; Fig. 2 is a similar view, broken away, illustrating the parts of the device in the locked position; Fig. 3 is a section taken on the line 3—3 of Fig. 1; Fig. 4 is a section taken on the line 4—4 of Fig. 2; Fig. 5 is a top plan view of the clutch cap or head; and Fig. 6 is a section taken on the line 6—6 of Fig. 5.

Similar numerals of reference indicate like parts throughout the several views on the drawing.

Referring to the drawing in detail, the numeral 1 indicates the top end of the usual steering post of a Ford motor car, said post being rotatably arranged within the usual hollow steering column 2 and provided with the usual head 3 which is disposed within the usual planetary gear housing 4 mounted upon the top end of the column 2. The numerals 5, 5 indicate the usual driven gears of the planetary gearing, said gears being mounted upon the post head 3, as usual, and meshing with the usual annular interior rack element 6 on the housing 4 for steering post actuation, as is well known.

Numeral 7 indicates the sun-gear, or driver pinion, of the steering head planetary gearing which remains in constant mesh with the driven gears 5 said pinion being rigid with the steering wheel shaft 8, the latter having its lower cylindrical end 9 journaled in the post 1 at 10, and said shaft having its upper cylindrical portion 11 formed to receive the bored hub of a steering wheel—not shown—and disposed exteriorly of the housing cap 12, said shaft 8 being provided also with a collar or flange 13 adapted to engage the upper wall of the cap chamber 15 to prevent upward axial movement of said shaft. The shaft 8 is journaled in the cap aperture 14 adjacent the flange 13. The cap 12 may be screw threaded upon the exterior of the housing 4 at 16 and secured against removal by a pin 17 driven transversely of and into the screw threads 16 of the housing. The upper end of the wheel shaft may be screw threaded at 18 to receive a nut for steering wheel retention, as is well known.

The numeral 19 indicates a fixed clutch rigid with the wheel shaft 8 and composed of an upward extension of the teeth of the gear 7 above the top plane or upper face of the driven gears 5 for any suitable distance and extending into the lower end of the cap chamber 15. Preferably, the clutch 19 is of lesser height than the length of the teeth of the driver pinion 7 to limit the height of the cap 12. Intermediate the clutch section 19 and the shaft flange 13 the shaft 8 may be cylindrically formed at 20, in encompassment of which the hollow cylindrical movable clutch element 21 is arranged within the cap chamber 15. The clutch 21 is splined to the wall of the cap chamber 15 by oppositely disposed keys 22, 22 which may be rigidly fixed in said clutch and which are adapted to slide in the upright grooves 23 formed in said chamber wall, Figures 3 and 4. The bore of the clutch 21 is provided with a plurality of inwardly and radially projecting teeth 24 which extend longitudinally of said bore and are adapted to engage the interstices of the clutch teeth 19 when the clutch 21 is lowered, as in Figures 2 and 4, to lock the shaft 8 against rotation.

A centrally apertured head plate 25 may be secured to the upper face of the clutch 21 by a plurality of screws 26, said plate being split in halves at 27, 27 to enable assembly around the shaft section 20. One side of the under face of the plate 25 may be cut away at 28 to enable the cam pin 29 of the key controlled lock 30 to engage beneath said plate. The lock 30 may be rigidly mounted in a chamber 31 and the cam pin 29 is adapted to be arcuately moved thereby when the operator uses a key in said lock, whereby said clutch 21 may be elevated or lowered for engagement and disengagement with the clutch teeth 24. A coil spring 32 bears against the clutch head 25. Normally, the clutch 21 is elevated, Fig. 1, for the driving position, in which position the shaft section 20 is freely rotatable within said clutch, and when the operator inserts a key in the lock cylinder 30 and turns it slightly, the spring 32 actuates the clutch 21 downward into engagement with the clutch teeth 24, thereby locking the shaft 8 to the cap 12.

An important and valuable feature of my invention resides in the use of the multi-tooth clutch 19 which enables the car driver to obtain the same number of locking positions as there are teeth in the driver pinion 7.

I claim:

1. In a steering device for vehicles, the combination with steering gear including a rotary steering post, a housing mounted relatively thereto, driven gears in said housing for steering post actuation, and a fixed cap for said housing, of a rotatable wheel shaft fixed against axial movement and provided with a driver pinion which is in constant mesh with said driven gears; clutch means carried by said shaft and comprising an extension of the teeth of said driver pinion; and means for locking said wheel shaft against rotation, said means comprising lock controlled movable clutch means splined to said housing cap, movable axially of said wheel shaft and independently thereof, and adapted to engage said clutch composed of the extension of said driver pinion teeth.

2. In a steering device for vehicles, the combination with steering gear including a rotary steering post, a housing mounted relatively thereto, driven gears in said housing for steering post actuation, and a fixed cap mounted on said housing, of a rotatable wheel shaft fixed against axial movement and provided with a driver pinion which is in constant mesh with said driven gears; clutch means carried by said shaft and comprising an extension of the teeth of said driver pinion; and means for locking said wheel shaft against rotation, said means comprising a lock controlled movable clutch encompassing said wheel shaft and splined to the interior of said housing cap, said clutch being movable axially of said wheel shaft and independently thereof and adapted to engage the interstices of the teeth of the shaft clutch.

3. In a steering device for vehicles, the combination with steering gear including a rotary steering post, a housing mounted relatively thereto, driven gears in said housing for steering post actuation, and a cap rigidly mounted upon said housing, of a rotatable wheel shaft fixed against axial movement and provided with a driver pinion which is in constant mesh with said driven gears; clutch means carried by said shaft and comprising an extension of the teeth of said driver pinion; a hollow cylindrical clutch element encompassing said wheel shaft, movable axially thereof within said housing cap and splined to the latter, the bore of said hollow clutch being provided with teeth which are adapted to engage the interstices of the teeth extended from said driver pinion to lock said wheel shaft against rotation; and lock controlled means for actuating said movable clutch element.

4. In a steering device for vehicles, the combination with steering gear including a rotary steering post, a housing mounted relatively thereto, driven gears in said housing for steering post actuation, and a fixed cap for said housing of a rotatable wheel shaft fixed against axial movement and provided with a driver pinion which is in constant mesh with said driven gears; clutch means carried by said shaft and comprising an extension of the teeth of said driver pinion; and means for locking said wheel shaft against rotation, said means comprising lock controlled movable clutch means mounted in said housing cap, movable parallel with the axis of said wheel shaft and independently thereof, and adapted to engage said driver pinion clutch means.

5. In a steering device for vehicles, the combination with steering gear including a rotary steering post, a housing mounted relatively thereto, driven gears in said housing for steering post actuation, and a fixed cap for said housing, of a rotatable wheel shaft fixed against axial movement and provided with a driver pinion which is in constant mesh with said driven gears; clutch means carried by said shaft and comprising an extension of the teeth of said driver pinion, the length of the teeth of said clutch means being less than the length of the teeth of said driver pinion; and lock controlled means adapted to engage said clutch means composed of the extension of said driver pinion teeth.

6. In a steering device for vehicles, the combination with steering gear including a rotary steering post, a housing mounted relatively thereto, driven gears in said housing for steering post actuation, and a fixed cap for said housing, of a rotatable wheel shaft fixed against axial movement and provided with a driver pinion which is in constant mesh with said driven gears; clutch means carried by said shaft and comprising an extension of the teeth of said driver pinion; and means for locking said wheel shaft against rotation, said means comprising spring pressed clutch means mounted in said housing cap and adapted to engage said driver pinion clutch.

7. In a steering device for vehicles, the combination with steering gear including a rotary steering post, a housing mounted relatively thereto, driven gears in said housing for steering post actuation, and a fixed cap mounted upon said housing, of a rotatable wheel shaft fixed against axial movement and provided with a driver pinion which is in constant mesh with said driven gears; clutch means carried by said shaft and comprising a circular series of recesses extending circumferentially of said shaft above the plane of engagement of said driver pinion teeth with said driven gears; movable clutch means mounted in said housing cap and adapted to engage one or more of said shaft recesses to lock said shaft and housing cap together to prevent rotation of said shaft; and a key-lock for controlling the movement of said movable clutch means.

8. In a steering device for vehicles, the combination with steering gear including a rotary steering post, a housing mounted relatively thereto, driven gears in said housing for steering post actuation, and a cap rigidly mounted on said housing, of a rotatable wheel shaft fixed against axial movement and provided with a driver pinion which is in constant mesh with said driven gears; clutch means carried by said shaft and comprising a plurality of teeth extending longitudinally of said shaft and coextensive with the circumference thereof; and lock controlled means for locking said wheel shaft against rotation, said means comprising spring pressed clutch means mounted in said housing cap and adapted to engage said shaft teeth.

9. In a steering device for vehicles, the combination with steering gear including a rotary steering post, a housing mounted relatively thereto, and driven gears in said housing for steering post actuation, of a fixed chambered cap mounted on said housing; a rotatable wheel shaft provided with a driver pinion which is in constant mesh with said driven gears, said shaft being provided also with a plurality of parallel clutch teeth extending longitudinally thereof; and a hollow movable clutch element splined within said housing cap chamber, encompassing said wheel shaft and adapted to engage said shaft clutch teeth to lock said shaft against rotation.

10. In a steering device for vehicles, the combination with steering gear including a rotary steering post, a housing mounted relatively thereto, driven gears in said housing for steering post actuation, and a fixed cap mounted upon said housing, of a rotatable wheel shaft fixed against axial movement and provided with a driver pinion which is in constant mesh with said driven gears; clutch means carried by said shaft and comprising a circular series of recesses extending circumferentially of said shaft above the plane of engagement of said driver pinion teeth with said driven gears; and movable clutch means mounted in said housing cap, said clutch means being movable parallel with the axis of said wheel shaft and adapted to engage said shaft recesses to lock said shaft and housing cap together to prevent rotation of said shaft.

11. In a steering device for vehicles, the combination with steering gear including a rotary steering post, a housing mounted relatively thereto, driven gears in said housing for steering post actuation, and a fixed cap mounted upon said housing, of a rotatable wheel shaft fixed against axial movement and provided with a driver pinion which is in constant mesh with said driven gears; clutch means carried by said shaft and comprising a circular series of recesses extending circumferentially of said shaft above the plane of engagement of said driver pinion teeth with said driven gears; a movable clutch element mounted in said housing cap and provided with a plurality of teeth arranged to a radius and adapted to engage in said shaft recesses to lock said shaft and housing cap together to prevent rotation of said shaft; and a key lock for controlling the movement of said movable clutch.

12. In a steering device for vehicles, the combination with steering gear including a rotary steering post, a housing mounted relatively thereto, driven gears in said housing for steering post actuation, and a cap rigidly mounted on said housing, of a rotatable wheel shaft fixed against axial movement and provided with a driver pinion which is in constant mesh with said driven gears; clutch means carried by said shaft and comprising a series of teeth extending longitudinally of said shaft and arranged therearound; and means for locking said shaft against rotation, said means comprising a plurality of lock controlled movable detent elements adapted to engage the interstices of said shaft clutch teeth.

In witness whereof I have hereunto affixed my signature.

LOUIS C. VANDERLIP.